United States Patent
Kutch (10) Patent No.: US 8,260,741 B2
(45) Date of Patent: Sep. 4, 2012

(54) SYSTEM AND METHOD FOR UTILIZING A MODULAR OPERATING SYSTEM (OS) RESIDENT AGENT ALLOWING AN OUT-OF-BAND SERVER MANAGEMENT

(75) Inventor: Patrick G. Kutch, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 2627 days.

(21) Appl. No.: 10/641,820

(22) Filed: Aug. 15, 2003

(65) Prior Publication Data

US 2005/0038808 A1 Feb. 17, 2005

(51) Int. Cl.
*G06F 7/00* (2006.01)
(52) U.S. Cl. .................. 707/609; 707/634
(58) Field of Classification Search .......... 707/10, 707/9, 104.1, 100, 609, 634
See application file for complete search history.

(56) References Cited

U.S. PATENT DOCUMENTS

| 5,315,580 | A | * | 5/1994 | Phaal | 370/232 |
| 5,471,634 | A | * | 11/1995 | Giorgio et al. | 1/1 |
| 5,671,413 | A | * | 9/1997 | Shipman et al. | 713/2 |
| 6,665,731 | B1 | * | 12/2003 | Kumar et al. | 709/246 |
| 6,912,691 | B1 | * | 6/2005 | Dodrill et al. | 715/234 |
| 6,973,587 | B1 | * | 12/2005 | Maity et al. | 714/6.31 |
| 2002/0129021 | A1 | * | 9/2002 | Brown | 707/10 |
| 2003/0131136 | A1 | * | 7/2003 | Emerson et al. | 709/250 |
| 2004/0103220 | A1 | * | 5/2004 | Bostick et al. | 709/253 |

* cited by examiner

*Primary Examiner* — Hosain Alam
*Assistant Examiner* — Eliyah S Harper
(74) *Attorney, Agent, or Firm* — Schwabe, Williamson & Wyatt, P.C.

(57) ABSTRACT

A pluggable, extensible, lightweight framework is described that allows an out-of-band server management connection to interact with a plurality of operating system (OS) resident agents.

24 Claims, 5 Drawing Sheets

SYSTEM AND METHOD FOR UTILIZING A MODULAR OPERATING SYSTEM (OS) RESIDENT AGENT ALLOWING AN OUT-OF-BAND SERVER MANAGEMENT

FIELD OF THE INVENTION

An embodiment of the present invention relates generally to management of network resources and components and, more specifically, to an architecture by which an Out-Of-Band connection can gain access to information presently available only to an In-Band stack interfacing with OS services or daemons.

BACKGROUND INFORMATION

Various mechanisms exist for monitoring and managing network processors. Server Management software typically has two methods by which a remote console can perform management of a network server. The first method is an "in-band" stack where an Operating System (OS) service/daemon retrieves data from the OS, basic input/output system (BIOS) or baseboard management controller (BMC), and reports this to the remote software via a Transfer Control Protocol/Internet Protocol (TCP/IP) connection. The second method is referred to as "Out-Of-Band", where a remote application communicates directly with the BMC of the server via a serial connection over a serial port or a local area network (LAN) connection over the Total Cost of Ownership (TCO) port. The TCO port is typically a network connection to the BMC (Baseboard Management Controller) accomplished via a UDP socket connection.

The Out-Of-Band management path provides various functionality; however, there are a number of features available In-Band that are not accessible Out-Of-Band. Examples of information not currently available Out-of-Band are: BIOS Version Information, the number of processors, total memory on the system, and resource usage. This type of information is accessible only via the OS of the server. Typically, operations that require OS assistance are not available for Out-of-Band management. Because of these limitations, Out-Of-Band management has been typically limited to retrieving information relating to power and heat. Typically, sensors within the hardware, for instance, CPU fans, SCSI controllers, etc. are accessible by the BMC. Information from the operating system is not accessible out-of-band. Out-of-band typically accesses only baseboard (motherboard) components, not hard drives or memory chips, for instance. For instance, Out-Of-Band management can monitor the temperature of the server and notify an operator if the system gets too hot.

BRIEF DESCRIPTION OF THE DRAWINGS

The features and advantages of the present invention will become apparent from the following detailed description of the present invention in which.

DETAILED DESCRIPTION

A system and method is disclosed for an architecture by which an Out-Of-Band connection can gain access to information presently available only to an In-Band stack interfacing with OS services or daemons. This plug-in architecture is extensible, allowing seamless access of new OS or management data.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

In one embodiment, the network server to be managed is compatible with the Intelligent Platform Management Interface (IPMI). The IPMI is a communication protocol for LANs or modem communication to a baseboard management controller (BMC). The IPMI 1.5 specification, for instance, defines a mechanism by which an Out-Of-Band connection can pass data back and forth to an OS agent via the BMC. In one embodiment, Server Management software currently uses the IPMI mechanism to determine the OS version of the server as well as perform a shutdown of the OS remotely. These actions are performed through the use of an OS resident agent, such as Intel® (Server Management, called Platform Instrumentation (PI).

The BMC is separate from the OS. PI is an OS resident agent. PI can get OS based information to which the BMC does not have access. However, the BMC can communicate with to the PI. The OS resident agent obtains information that was placed, or stored, by the BMC. OS resident agents, as used in state of the art systems, only understand three commands: (i) turn off; (ii) restart, and (iii) request OS version. In current systems, the PI must exist for these actions to be performed. In some systems PI has a modular interface design, allowing it to use a plugin interface.

Figure 1:
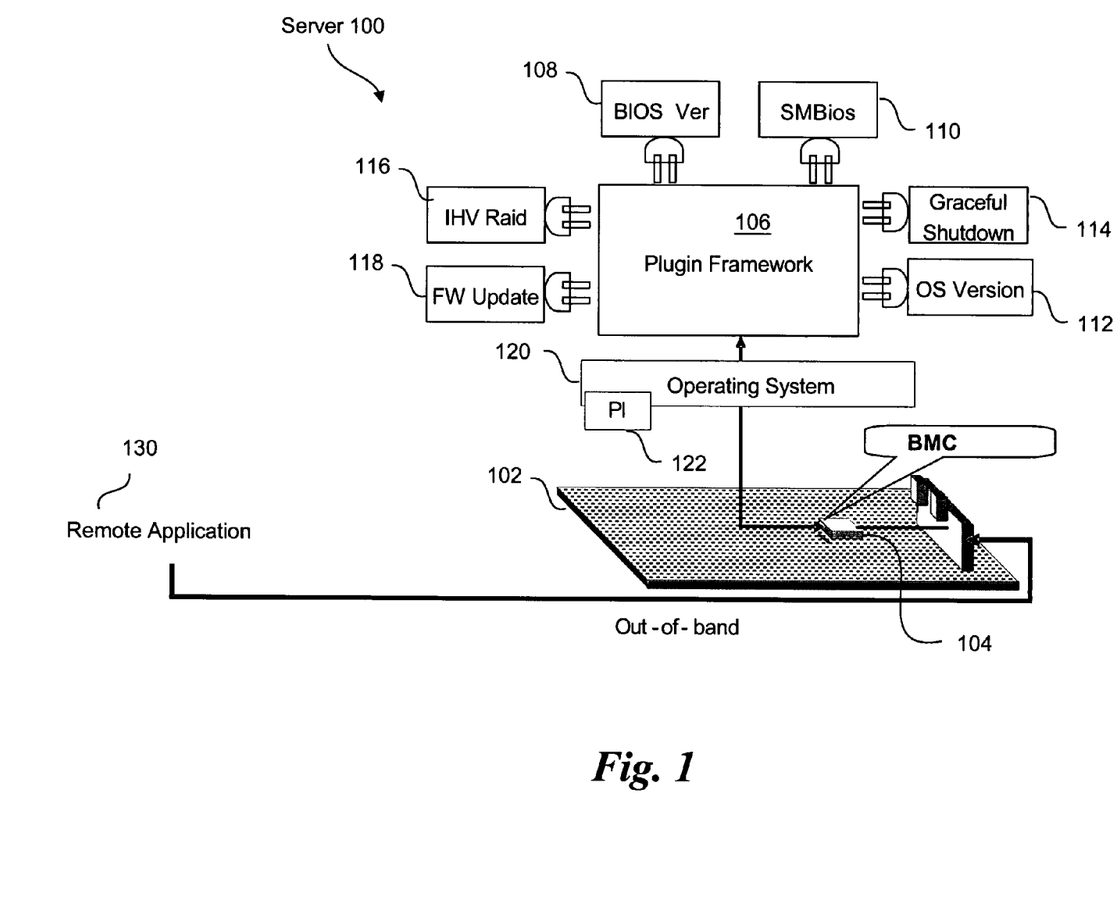
FIG. 1 is a block diagram of an exemplary managed network system, for example, a server.

FIG. 1 is a block diagram of an exemplary managed network system, for example, a server 100. The server 100 has a motherboard 102. Operatively coupled to the motherboard 100 is a baseboard management controller (BMC) 104. The BMC 104 comprises a plugin framework 106. The plugin framework 106 is capable of retrieving information such as BIOS version 108, SMBIOS (System Management BIOS provides information configured by the manufacturer about a computing device, such as a personal computer (PC)) 110, OS version 112, and independent hardware vendor redundant array of inexpensive disks (IHV RAID) device information 116. The exemplary plugin framework 106 is also capable of performing actions such as firmware (FW) updates 118 and graceful shutdown 114. In one embodiment, this capability allows a remote operator using a remote application 130 to shutdown a server using Out-Of-Band management. The framework is the core to which the plugin gets added. It is analogous to a wall with a socket, where the lamp plugs into the socket. Any electrical device with a plug of that type will plug into the same socket. The plugin architecture is well known to those of ordinary skill in the art.

An advantage of Out-of-band management is that the monitored, or managed, processor is not used for application threads or sockets unless the management request is for the OS resident agent, for example, PI. During server system operation, PI is always running and polls for data at periodic intervals.

In an embodiment of the system and method described herein, the state of the art proprietary format used for PI commands is replaced with a more flexible format, such as eXtensible Markup Language (XML). In this embodiment, a data request is sent in the form of an XML message. The XML message is broken into packets and is sent to PI via BMC. Once received, the PI reassembles the packets and parses the message to determine the requested action, and who should perform the requested action. A variety of actions may be defined for this interface, and is not limited to the three actions currently performed by the PI.

In one embodiment, there are two modes of server management: In-band and Out-Of-Band. For In-band management, the server 100 must be running. An agent 122 runs on the OS 120 with standard level sockets, for instance, TCP/IP, UDP (User Datagram Protocol, a network protocol for transferring data packets), CIM (component information model) or DMI (desktop management interface). Out-Of-Band management is independent of the OS and OS state. In one embodiment, the OS must be running to perform the requested actions, because the PI 122 and BMC 104 communicate with each other to send/receive/parse the XML packets, and the OS resident agent is run when the OS is running.

A core plug-in framework 106 is responsible for communicating to the remote software 130 via the BMC 104. The remote software 130 may make a request of a specific plugin or component. The framework 106 receives this request, determines which plugin the request is destined for and passes the request along. The plugin, in response, performs the desired action and sends a response back through the framework.

In one embodiment, format of the requests and the responses is encapsulated within XML for easy portability and readability.

The plugin framework works in conjunction with a similar component on the remote client side that handles details such as packaging the requests into packets and transmitting them. A given request may exceed the size limitation imposed by IPMI, which in one embodiment is approximately 32 bytes per message. As such, the framework would need to be able to take a given request or response and break it up into multiple packets for transmission and to be able to re-assemble them.

Figure 2:
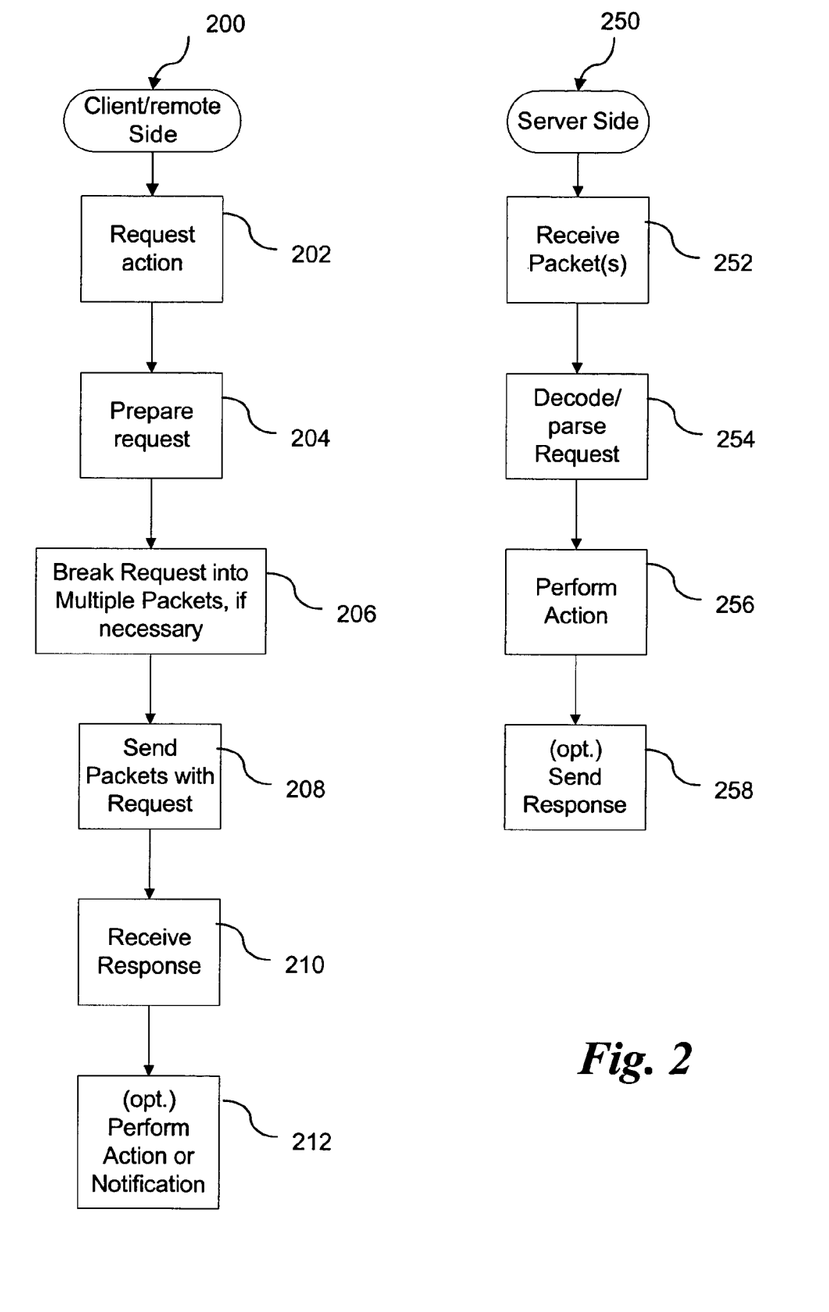
FIG. 2 is flow diagram illustrating an exemplary method for communication between the Platform Instrumentation (PI) and the baseboard management controller (BMC)

Referring now to FIG. 2, there is shown a flow diagram illustrating an exemplary method for communication between the PI and the BMC. A user at a remote console 200, running a remote application 130, desires an action to be performed, or information retrieved, from the server. The remote application 130 requests the action in block 202. The request is prepared according to an extensible framework protocol to be more fully described below, in block 204. If necessary, the remote application breaks the request into multiple packets, in block 206. The packets are then sent to the BMC via an Out-of-band connection, in block 208. Information regarding the IPMI 1.5 specification can be found on the Internet, specifically on the web site of Intel Corporation at http://developer.intel.com/design/servers/ipmi.

The server side 250 receives the packet(s) request at the BMC in block 252. The packets are recombined, if necessary, and parsed to determine the appropriate action in block 254. The appropriate action or information retrieval is performed in block 256, and a response may be sent back to the Out-Of-Band remote application, if necessary, in block 258. In some cases, for instance, a shutdown request, the server may perform the action and then be unable to send a response. In other cases, no response is necessary.

If sent, the response is received by the remote client in block 210. In some embodiments, the response may trigger an action or notification, which is performed in block 212.

In one embodiment, each plugin has a unique GUID (identifier) associated with it. This GUID is part of the request and used by the framework to determine the target plugin for a specified action. The framework itself supports several methods. One such method allows enumerating all of the available plugins. In one embodiment, a form of request may be similar to the following:

```
<Request>
    <Framework Request>
        <Request>Enumerate Plugins</Request>
    <Framework Request>
</Request>
```

The framework request from the remote application asks for a list of plugins that are accessible to the management system. The framework would then respond with a response such as the following:

```
<Response>
    <Framework Response>
        <Plugin>
    <GUID>3782-2293-4999-3374</GUID>
    <Description>BIOS Version Information</Description>
        </Plugin>
        <Plugin>
    <GUID>3456-2833-4931-3874</GUID>
    <Description>Firmware Update utility</Description>
        </Plugin>
    </Framework Response>
</Response>
```

This response indicates that two plugins are present and accessible. The first has identifier (GUID) of 3782-2293-4999-3374, and will retrieve BIOS version information. The second has identifier (GUID) 3456-2833-4931-3874, and is a firmware update utility. The second plugin allows remote updating of the firmware.

In one embodiment, the remote application "calls" a specific plugin, requesting a method invocation. For instance, to request version information consistent with the above example, the following request may be sent:

```
<Request>
    <Plugin Request>
        <GUID>3782-2293-4999-3374</GUID>
        <Invoke Method>VersionInformation</Invoke Method>
    <Plugin Request>
</Request>
```

In this example, the VersionInformation method is invoked with a request to the BIOS version plugin. An exemplary response follows:

```
<Response>
    <Plugin Response>
        <GUID>3782-2293-4999-3374</GUID>
        <Response>Intel BIOS 8.22 Built January 2, 1999</Response>
    </Plugin Response>
</Response>
```

The response returns the requested information: "Intel BIOS 8.22 Built Jan. 2, 1999."

Figure 3:
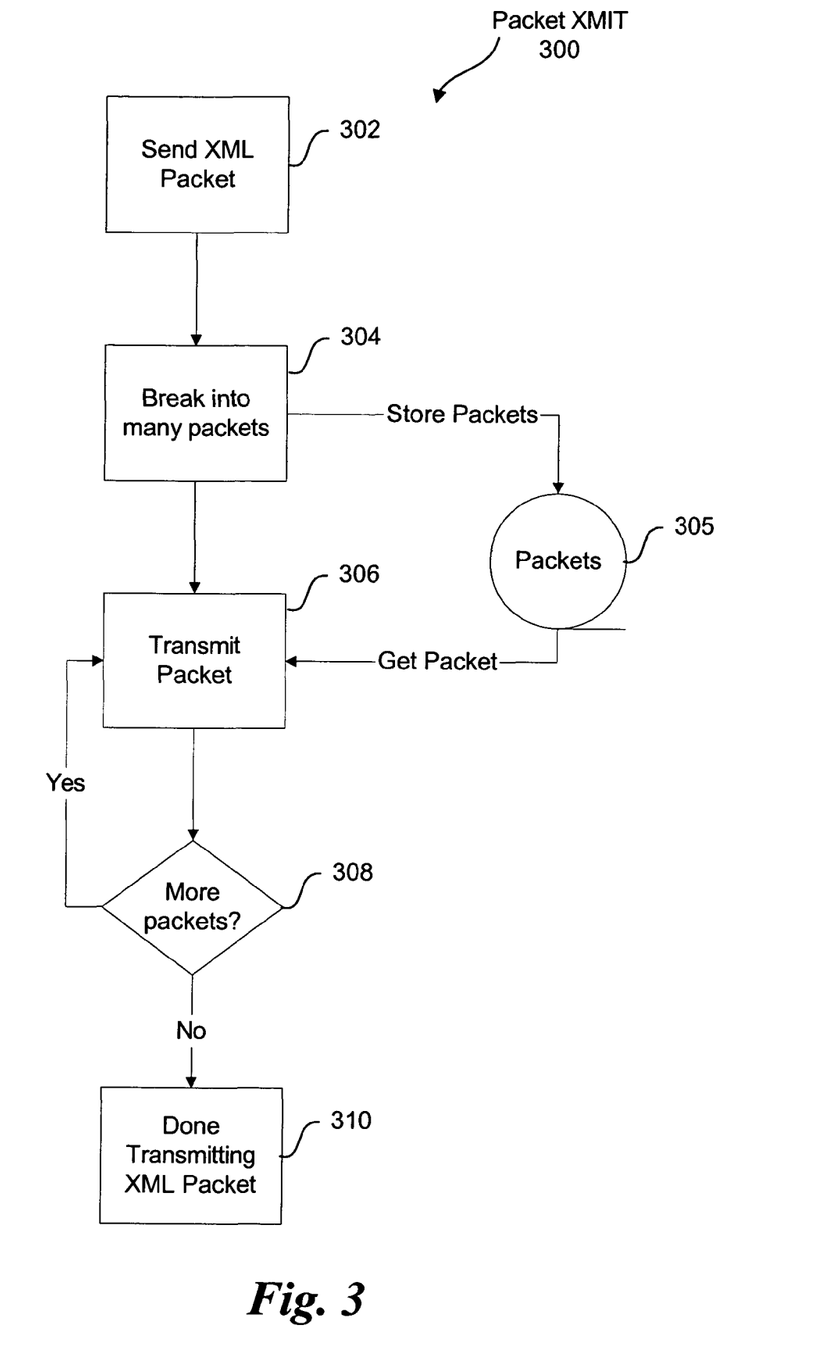
FIG. 3 is a flow diagram of an exemplary method for transmitting an eXtensible Markup Language (XML) packet, according to an embodiment of the system and method described herein.
Figure 4:
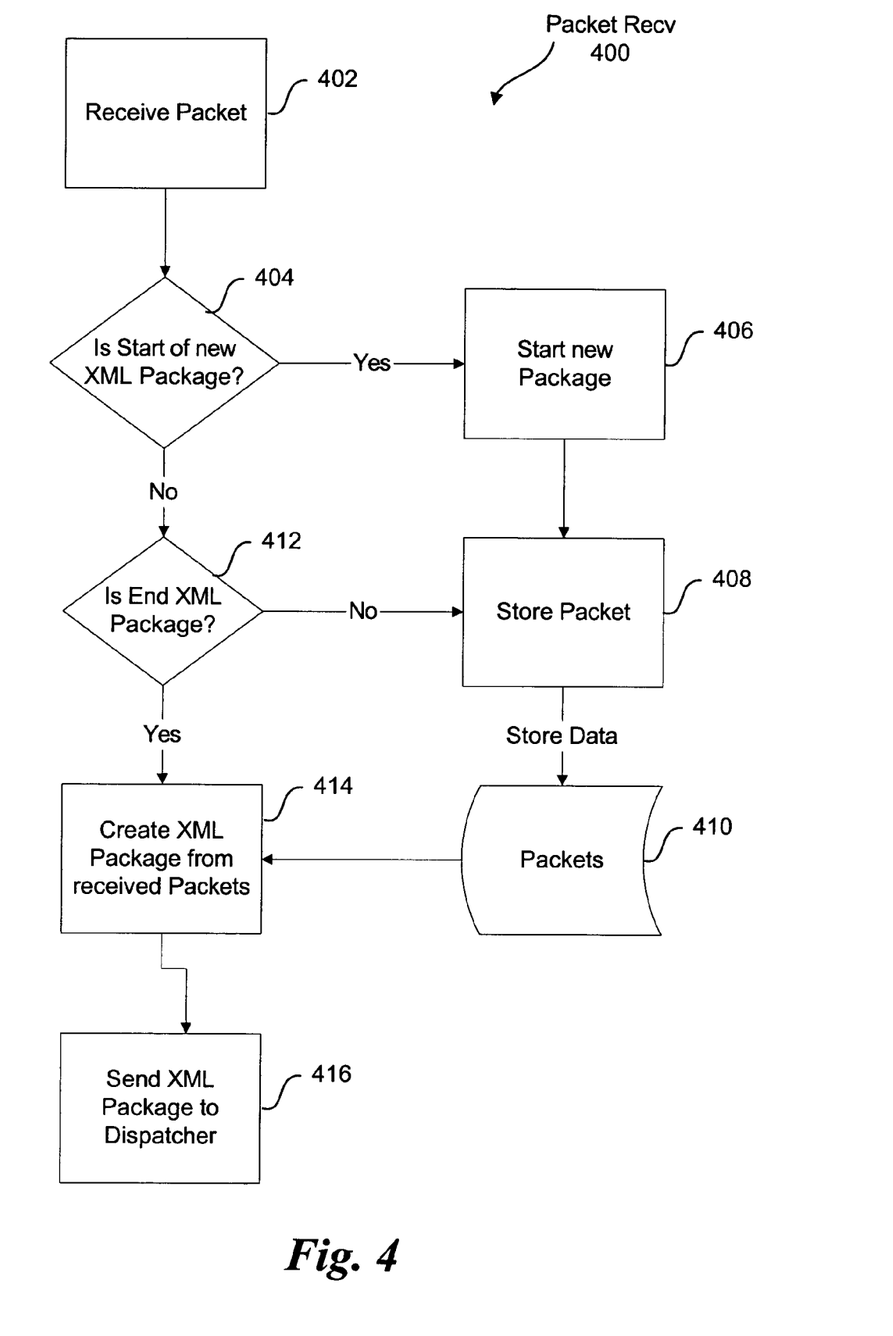
FIG. 4 is an exemplary method for receiving an XML packet, according to an embodiment of the system and method described herein.
Figure 5:
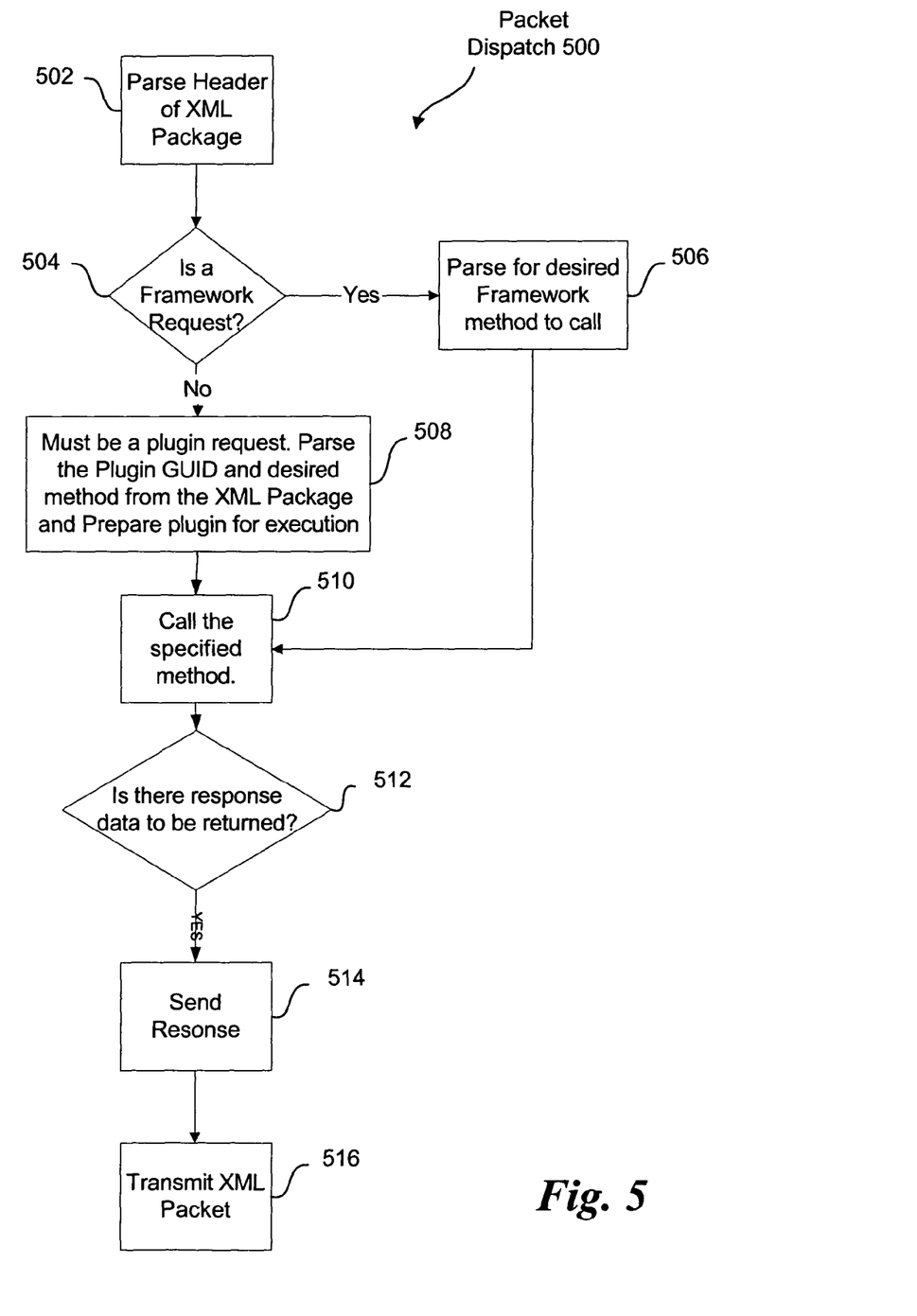
FIG. 5 is a flow diagram illustrating an exemplary method for the dispatch of an XML package.

In one embodiment, XML package construction and parsing is performed as shown in exemplary flow diagrams illustrated by FIGS. 3-5. Referring to FIG. 3, there is shown an exemplary method 300 for transmitting a packet. An XML packet is sent by the remote application, in block 302. If this packet is too large to be accommodated by the communication protocol, for instance IPMI, then it is broken into smaller packets in block 304. The packets are stored 305 and then retrieved one at a time to be transmitted 306. A determination is made as to whether there are additional packets to send, in block 308. If so, the next packet is retrieved from storage and transmitted in block 306. It will be apparent to one skilled in the art that the packets may be stored in local flash memory, system memory, mass storage, or any other accessible memory location. When there are no more packets to send, the transmit process ends in block 310.

Referring now to FIG. 4, there is shown an exemplary method 400 for receiving an XML packet. The packet is received by the BMC in block 402. The packet is parsed and a determination is made as to whether the packet is the beginning of a new XML package in block 404. If it is, then a new package is begun in block 406. The packet 410 is stored in block 408. If the packet is not the start of a new package, then a determination is made as to whether it is the end of the package. If not, the packet 410 is stored in block 408. If it is the end of a package, then an XML package is created from all of the received packets 410, in block 414. Once the package is reconstructed, it is sent to the dispatcher so that the requested action can be performed. The dispatcher may be part of the OS resident agent, or part of the framework. The dispatcher is responsible for determining what method in the framework must be executed, or launched, in order to fulfill the request received in the package.

Referring now to FIG. 5, there is shown an exemplary method 500, illustrating the dispatch of an XML package. The package is received by the dispatcher and the header is parsed in block 502. If it is a framework request, as determined by block 504, then the package is parsed to determine which framework method to execute, in block 506. If it is not a framework request, then the plugin GUID and desired method are parsed from the XML package, in block 508, and the plugin is prepared for execution. For instance, a framework request could be a request to return a list of all available plugins, and a plugin request could be a request to update the firmware. It will be apparent to one of ordinary skill in the art, that various plugins can be implemented for a given framework. The desired method is then called in block 510. If there is a response required, as determined in block 512, then a response is constructed and sent in block 514. The XML packet is then transmitted in block 516. If no response is required, then the process exits.

This exemplary dispatch mechanism provides a highly flexible and customizable method of adding capabilities to a BMC framework. Support for remote updating of Firmware and BIOS are advantages over state of the art remote management systems. Other, more complex actions, such as thread count and CPU load monitoring may also be performed in this manner.

In one embodiment, a plugin module is created to perform a specific task, such as to update the BIOS. A remote client issues a request to that specific plugin to update the BIOS and send the accompanying BIOS image as well. The BIOS image is broken into multiple, separate packets. The frameworks on the client and remote side have the responsibility of breaking down the image and re-assembling it. The plugin for the BIOS update is called by the framework (after it has re-assembled all of the data) and instructed to perform the task with the given BIOS image. The BIOS is updated, as requested, and a completion notice is sent back to the remote client.

Embodiments of a remote server management system and method as described above enables Out-Of-Band capabilities that are currently only feasible via an In-Band connection. The OS resident stack used for In-band management, today, is large and takes up valuable system resources. The embodiments described herein provide similar, and also expanded, functionality with little cost to system resources. With the exception of the framework polling for incoming requests, the plugins themselves do not need to be active until called upon by the framework to perform a task.

The techniques described herein are not limited to any particular hardware or software configuration; they may find applicability in any computing, consumer electronics, or processing environment. The techniques may be implemented in hardware, software, or a combination of the two. The techniques may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, that may include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various system configurations, including multiprocessor systems, minicomputers, mainframe computers, independent consumer electronics devices, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method for remotely managing a host computing device, comprising:
   sending, from a remote application, a package to the host computing device via an out-of-band connection;
   receiving, by the host computing device, the sent package;
   parsing the package, the package comprising one or more packets, wherein each packet is a size capable of being accommodated by the out-of-band-connection;
   determining an action requested based on the parsed package; and
   performing the requested action,
   wherein sending packages via the out-of-band-connection comprises communicating packets to a baseboard management controller (BMC) on the host computing device, wherein the BMC communicates with an operating system (OS) agent on the host computing device, and
   wherein the requested action is selected from a group consisting of request OS version, perform shutdown, request BIOS version, request SMBIOS information, request independent hardware vendor (IHV) information, and update host computing device firmware.

2. The method as recited in claim 1, wherein the OS agent comprises a framework for dispatching received requests.

3. The method as recited in claim 1, wherein the packets are encoded in extensible Markup Language (XML).

4. A method for requesting an action on a host computing device, by a remote management system, comprising:
   determining an action to be performed by the host computing device, wherein the action to be performed is selected from a group consisting of request OS version, perform shutdown, request BIOS version, request SMBIOS information, request independent hardware vendor (IHV) information, and update host computing device firmware;
   generating a request package, wherein the package indicates an action to be performed and includes corresponding data;
   generating at least one packet of information from the request package, wherein each packet is of a size capable of being accessed by a baseboard management controller on the host computing device; and
   transmitting the at least one generated packet to the baseboard management controller operatively connected to the computing device.

5. The method as recited in claim 4, wherein the transmitting is via an out-of-band connection.

6. The method as recited in claim 5, wherein the packets are encoded in extensible Markup Language (XML).

7. The method as recited in claim 5, wherein the computing device is a network server.

8. A method for enabling remote, out-of-band management of a host computing device, comprising:
   receiving a request package, the request package comprising one or more request packets, wherein the package indicates a request and includes data corresponding to the request, wherein the request is selected from a group consisting of request OS version, perform shutdown, request BIOS version, request SMBIOS information, request independent hardware vendor (IHV) information, and update host computing device firmware;
   determining a beginning packet and an end packet of the request package;
   reconstructing the request package from the one or more request packets; and
   sending the request package to a dispatcher, wherein the dispatcher comprises an operating system (OS) agent, and wherein the request packets are received via an out-of-band connection by a baseboard management controller coupled to the host computing device.

9. The method as recited in claim 8, wherein the beginning packet and end packet are the same packet.

10. The method as recited in claim 8, wherein the dispatcher
    parses a header of the received package;
    determines whether a type is associated with the package request; and
    executes a method corresponding to the associated type of the package request.

11. The method as recited in claim 10, further comprising determining whether a response is requested, and if so, then sending the requested response to a remote application via the out-of-band connection.

12. The method as recited in claim 10, wherein the type is one of plugin and framework.

13. A tangible non-transitory machine accessible medium comprising instructions for remotely managing a host computing device, the instructions structured to enable a machine to:
    receive, by an operating system (OS) agent on the host computing device, a package sent from a remote application, the package sent via an out-of-band connection and first received by a baseboard management controller coupled to the host computing device;
    parse the package, the package comprising one or more packets, wherein each packet is a size capable of being accommodated by the out-of-band-connection;
    determine an action requested; and
    perform the requested action, wherein the requested action is selected from a group consisting of request OS version, perform shutdown, request BIOS version, request SMBIOS information, request independent hardware vendor (IHV) information, and update host computing device firmware.

14. The tangible non-transitory machine accessible medium as recited in claim 13, wherein the packets are encoded in extensible Markup Language (XML).

15. A non-transitory machine accessible medium comprising instructions for requesting an action on a host computing device, by a remote management system, the instructions structured to enable a machine to:
   determine an action to be performed by the computing device, wherein the action to be performed is selected from a group consisting of request OS version, perform shutdown, request BIOS version, request SMBIOS information, request independent hardware vendor (IHV) information, and update host computing device firmware;
   generate a request package, wherein the package indicates an action to be performed and includes corresponding data;
   generate at least one packet of information from the request package, wherein each packet is of a size capable of being accessed by a baseboard management controller on the host computing device; and
   transmit the at least one generated packet to the baseboard management controller operatively connected to the computing device.

16. The non-transitory machine accessible medium as recited by claim 15, wherein the transmitting is via an out-of-band connection.

17. The non-transitory machine accessible medium as recited by claim 15, wherein the packets are encoded in extensible Markup Language (XML).

18. A tangible machine accessible medium comprising instructions for enabling remote, out-of-band management of a computing device, the instructions structured to enable a machine to:
   receive a request package, the request package comprising one or more request packets, wherein the package indicates a request and includes data corresponding to the request;
   determine a beginning packet and an end packet of the request package;
   reconstruct the request package from the one or more request packets; and
   send the request package to a dispatcher, wherein the dispatcher comprises an operating system (OS) agent, and wherein the request packets are received by a baseboard management controller coupled to the host computing device via an out-of-band connection, and
   wherein the request is selected from a group consisting of request OS version, perform shutdown, request BIOS version, request SMBIOS information, request independent hardware vendor (IHV) information, and update host computing device firmware.

19. The machine accessible medium as recited in claim 18, wherein the dispatcher further comprises instructions causing the machine to:
   parse a header of the received package;
   determine whether a type associated with the package request; and
   execute a method corresponding to the associated type of the package request.

20. The machine accessible medium as recited in claim 19, wherein the instructions further comprise determining whether a response is requested, and if so, then sending the requested response to a remote application via an out-of-band connection.

21. A system for remote management of a host computing device, comprising:
   the host computing device capable of communicating with a remote application, the host computing device having a baseboard management controller (BMC) and processor running an operating system (OS), wherein the remote application communicates with the BMC via an out of band connection; and
   an OS resident agent capable of communicating with the BMC, wherein the OS resident agent receives request packages from the remote application via the BMC, wherein the request package comprises a request to perform an action and related data, and
   wherein the action to be performed is selected from a group consisting of request OS version, perform shutdown, request BIOS version, request SMBIOS information, request independent hardware vendor (IHV) information, and update host computing device firmware.

22. The system as recited in claim 21, wherein the OS resident agent further comprises a plugin framework for dispatching requests received in the request package.

23. The system as recited in claim 21, wherein the request package comprises one or more packets of information.

24. The system as recited in claim 21, wherein the packets are formatted in extensible Markup Language (XML).

* * * * *